(12) United States Patent
Despesse

(10) Patent No.: US 9,936,549 B2
(45) Date of Patent: Apr. 3, 2018

(54) LED LIGHTING DEVICE

(71) Applicant: COMMISSARIAT A L'ENERGIE ATOMIQUE ET AUX ENERGIES ALTERNATIVES, Paris (FR)

(72) Inventor: Ghislain Despesse, Voreppe (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 14/834,954

(22) Filed: Aug. 25, 2015

(65) Prior Publication Data
US 2016/0066381 A1 Mar. 3, 2016

(30) Foreign Application Priority Data
Aug. 26, 2014 (FR) .................................... 14 58000

(51) Int. Cl.
*H05B 33/08* (2006.01)

(52) U.S. Cl.
CPC ..... *H05B 33/0824* (2013.01); *H05B 33/0809* (2013.01); *H05B 33/0854* (2013.01); *H05B 33/0896* (2013.01)

(58) Field of Classification Search
CPC  H05B 33/08; H05B 33/0824; H05B 33/0809; H05B 33/0896; H05B 37/02
See application file for complete search history.

(56) References Cited

U.S. PATENT DOCUMENTS

| | | | |
|---|---|---|---|
| 2010/0134018 A1 | 6/2010 | Tziony et al. | |
| 2011/0037082 A1 | 2/2011 | Doan et al. | |
| 2011/0127922 A1* | 6/2011 | Sauerlaender | H05B 33/0809 315/192 |
| 2012/0161651 A1* | 6/2012 | Hon | H05B 33/0815 315/191 |
| 2012/0256550 A1* | 10/2012 | Akiyama | H05B 33/0824 315/187 |

(Continued)

FOREIGN PATENT DOCUMENTS

| | | |
|---|---|---|
| DE | 10 2007 006 438 A1 | 8/2008 |
| EP | 2 624 662 A2 | 8/2013 |

(Continued)

OTHER PUBLICATIONS

French Search Report and Written Opinion dated Dec. 19, 2014, issued in counterpart French application No. FR1458000; w/ partial English translation and partial machine English translation (14 pages).

*Primary Examiner* — Thai Pham
(74) *Attorney, Agent, or Firm* — Westerman, Hattori, Daniels & Adrian, LLP

(57) ABSTRACT

Lighting and/or display device with low-voltage individual lighting components such as a light-emitting diode, characterized in that it comprises a plurality of individual modules (1) electrically connected together so as to be able to be arranged in series, at least one module comprising a lower terminal (2) and a upper terminal (3), between which are arranged at least two individual lighting components and a plurality of switches (5, 7, 8), so as to be able to arrange two individual lighting components in series or in parallel between the two lower (2) and upper (3) terminals.

24 Claims, 15 Drawing Sheets

(56) References Cited

U.S. PATENT DOCUMENTS

| | | | |
|---|---|---|---|
| 2012/0299490 A1* | 11/2012 | Lee | H05B 33/0824 |
| | | | 315/191 |
| 2012/0299498 A1* | 11/2012 | Quaal | H05B 37/0227 |
| | | | 315/210 |
| 2013/0026925 A1* | 1/2013 | Ven | H05B 33/0824 |
| | | | 315/122 |
| 2013/0088160 A1* | 4/2013 | Chai | H05B 33/083 |
| | | | 315/193 |
| 2013/0207548 A1 | 8/2013 | Leshniak | |
| 2014/0021860 A1 | 1/2014 | Baccarin et al. | |
| 2014/0159593 A1* | 6/2014 | Chu | H05B 33/0824 |
| | | | 315/191 |

FOREIGN PATENT DOCUMENTS

| | | |
|---|---|---|
| JP | 2012151337 A | 8/2012 |
| WO | 2010013172 A1 | 2/2010 |

\* cited by examiner

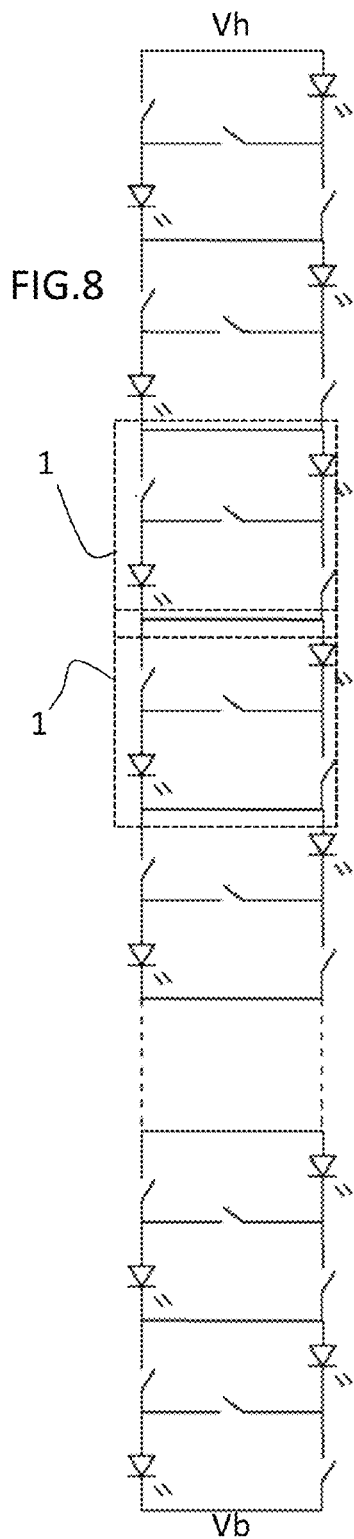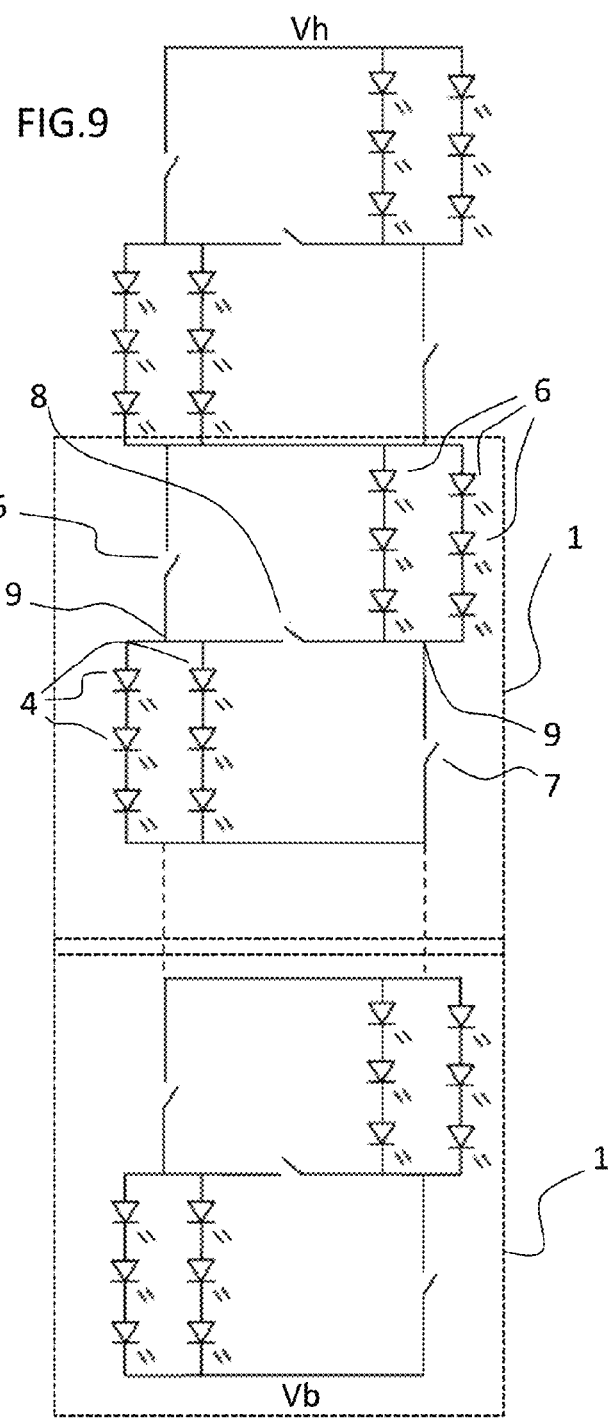

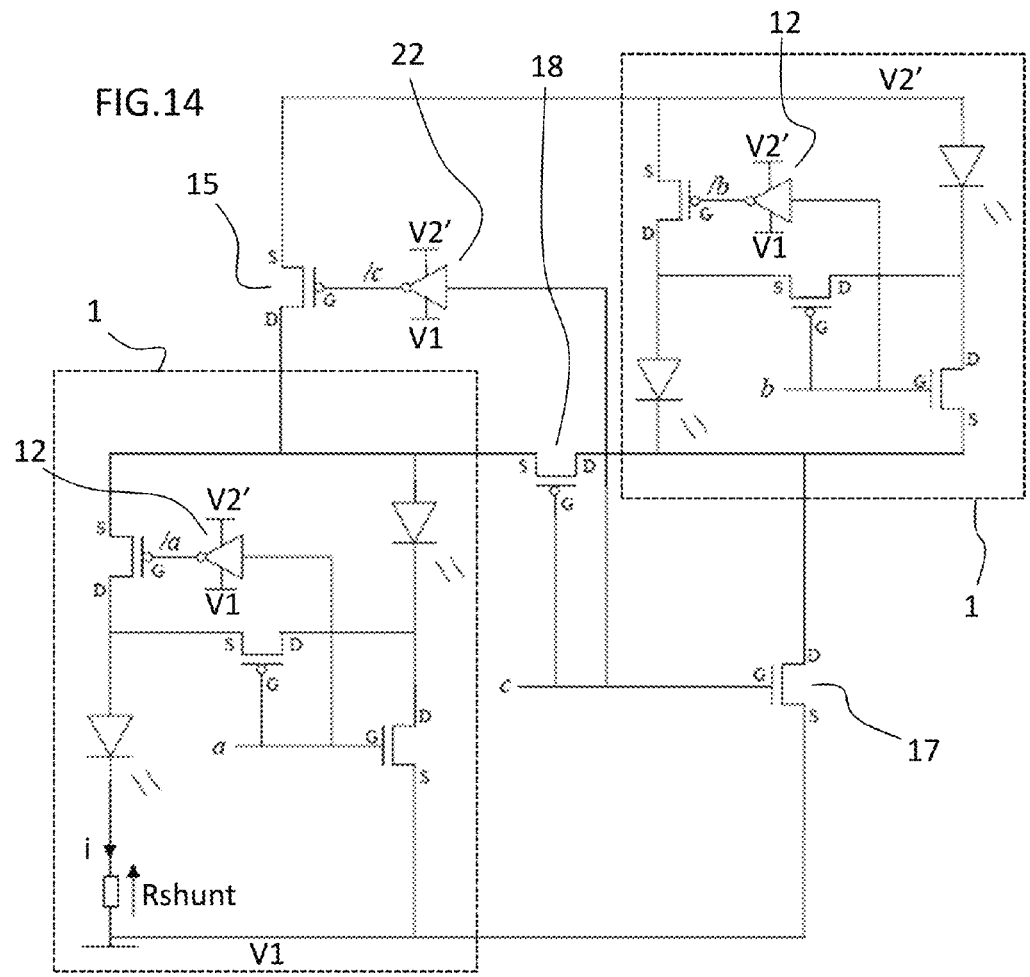
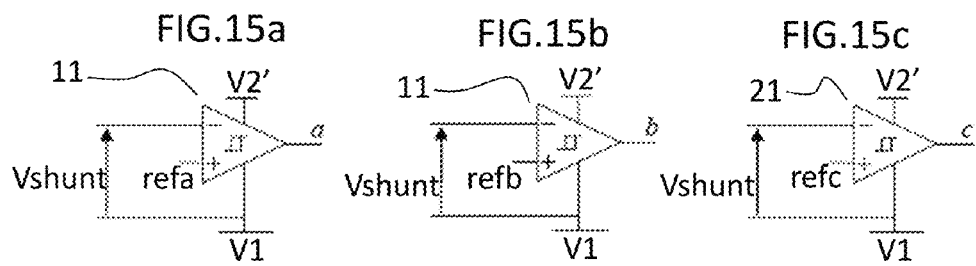

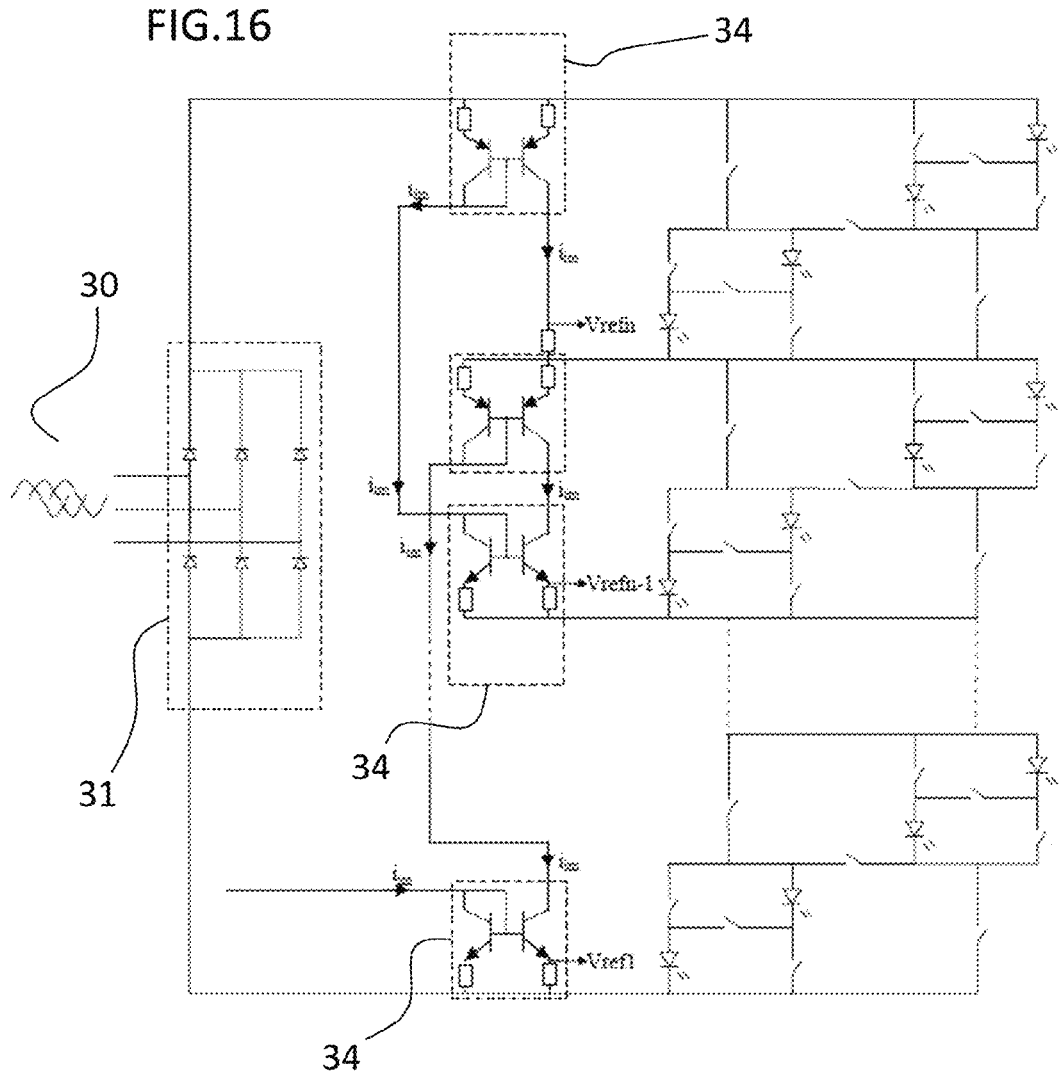

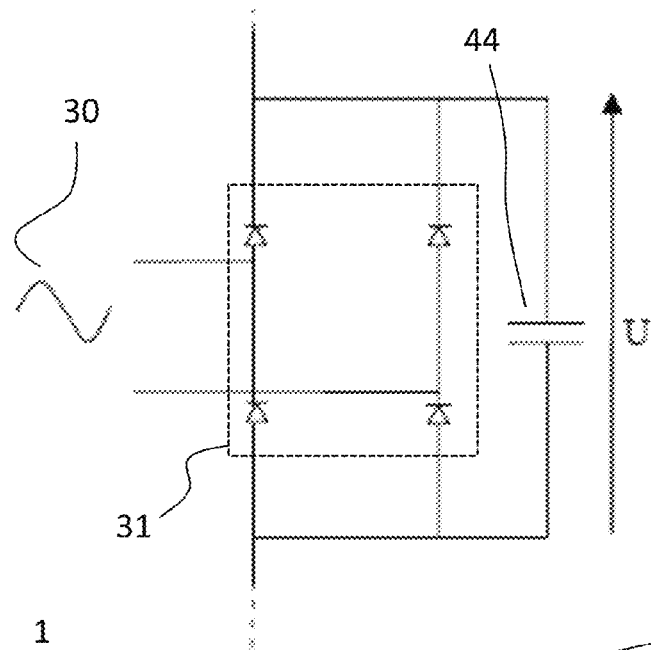
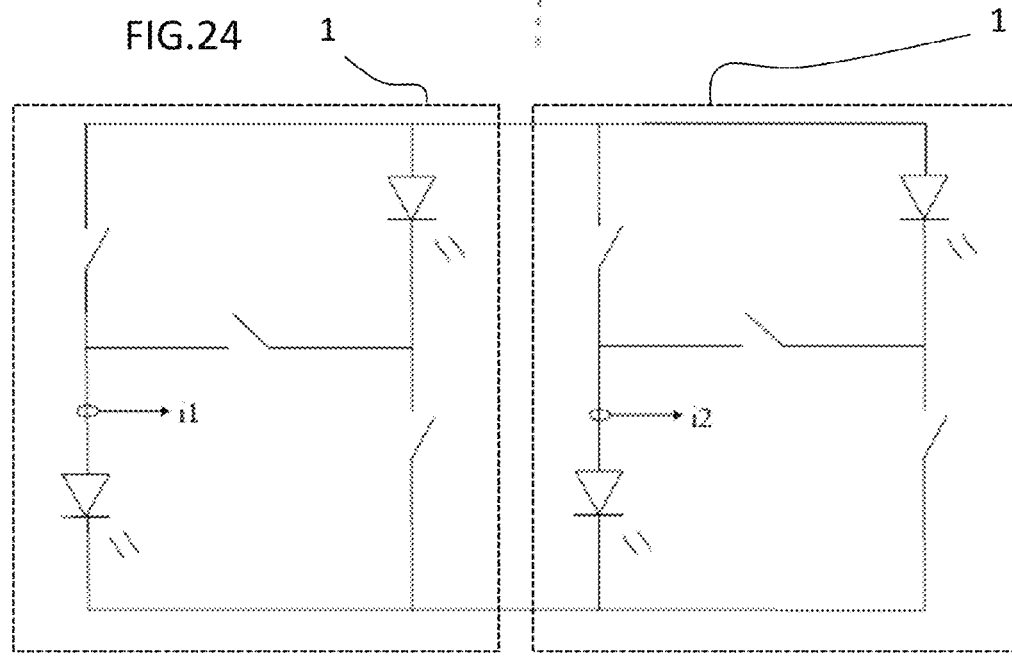

LED LIGHTING DEVICE

The invention relates to a low-voltage lighting or display device, notably a light-emitting diode. It relates also to a method for managing such a device.

Light-emitting diode (LED) lighting is becoming increasingly commonplace. To obtain a satisfactory lighting level, an LED lighting device of the prior art relies on a large number of individual LEDs. Such a device requires a particular electrical power supply, which ensures that it does not exceed the maximum allowable current for each LED. For that, there are now circuits which make it possible to ensure this power supply, for example by a switched-mode power supply, from a direct and relatively low (<24 or 48 V) voltage source. The connection of such a lighting device to a power source of conventional alternating electrical network type is not immediate, because the peak voltage of such a source exceeds the maximum allowable voltage for each LED.

To meet the abovementioned constraints, the document US 20100134018 describes a solution in which it is possible to place a more or less significant number of LEDs in series, for each LED to receive, at its terminals, an optimum voltage for its operation. This device does, however, present the drawback that each LED remains shunted for a significant time, which reduces the efficiency of the lighting.

Thus, there is a need for an improved solution for a lighting or display device based on low-voltage individual lighting components, such as LEDs.

To this end, the invention relies on a lighting and/or display device with low-voltage individual lighting components such as a light-emitting diode, characterized in that it comprises a plurality of individual modules electrically connected together so as to be able to be arranged in series, at least one module comprising a lower terminal and an upper terminal, between which are arranged at least two individual lighting components and a plurality of switches, so as to be able to arrange two individual lighting components in series or in parallel between the two lower and upper terminals, and characterized in that the at least one individual module comprises a control circuit for switches of said individual module, the control circuit for switches being connected to the device so as to have, at its terminals, a low-voltage potential difference corresponding to the potential difference between the lower terminal and the upper terminal of said individual module or the potential difference between a terminal of said individual module and a terminal of a neighbouring individual module.

The low-voltage individual components can be light-emitting diodes, notably LED and/or OLED and/or PLED and/or PHLED.

The at least one individual module can comprise a first branch extending between its lower and upper terminals and comprising, in order, at least one LED and a switch, a second branch parallel to the first branch between its lower and upper terminals comprising, in order, a switch and at least one LED, and an intermediate branch comprising an intermediate switch and respectively linking the intermediate terminals arranged between the at least one LED and the switch of each of the two parallel branches.

The at least one individual module can comprise at least one sensor for measuring a quantity characteristic of the state of the individual module, such as the current, the light intensity generated, the voltage, or the temperature, and the control circuit for the switches of the individual module can control them according to the measured characteristic quantity.

The lighting and/or display device can comprise a circuit for the transmission of a current setpoint to said at least one individual module.

The control circuit for switches can comprise a comparator and an inverting gate.

The at least one individual module can comprise at least one storage component which makes it possible to restore energy to at least one individual lighting component when its power supply voltage is insufficient for its lighting.

All the individual modules can be connected in series and comprise at least two LEDs and a plurality of switches, so as to be able to arrange two LEDs in series or in parallel.

The lighting and/or display device can comprise switches arranged on three link branches between two neighbouring modules to allow the two neighbouring modules to be linked in series or in parallel and/or can comprise switches arranged on three link branches between two neighbouring subassemblies of the device, each subassembly comprising a plurality of individual modules, to allow the two neighbouring subassemblies to be linked in series or in parallel.

The lighting and/or display device can comprise a rectifier bridge or a plurality of rectifier bridges each associated with a subassembly of individual modules to rectify the power supply voltage, and/or can comprise one or more H-configuration bridges making it possible to shunt at least one individual module in case of insufficient power supply voltage.

The lighting and/or display device can comprise an ASIC for each individual module.

The lighting and/or display device can comprise switches suitable for occupying a semi-open position to fulfil a current regulating/limiting function.

The switches can be controlled switches, such as bipolar transistors or MOS transistors.

The invention relates also to a method for managing a lighting and/or display device, characterized in that it comprises a step of determination of the position of the switches of an individual module to arrange two individual lighting components in series or in parallel, via a control generated by a control circuit for said switches powered by a low-voltage potential difference corresponding to the potential difference between the lower terminal and the upper terminal of the module comprising the switches or the potential difference between a terminal of said module and a terminal of a neighbouring module.

The method for managing a lighting and/or display device can comprise the following steps:
  measurement of at least one quantity at the level of a module, such as the current, a voltage, the temperature, or a light intensity;
  transmission of said measured quantity to at least one control circuit or a computer;
  determination of the position of a switch of a module or of a subassembly of modules and controlling of the opening or closing of the at least one switch, by taking into account said measured quantity.

The method for managing a lighting and/or display device can comprise a step of regulation, by hysteresis, of the configuration of the lighting and/or display device.

These objects, features and advantages of the present invention will be explained in detail in the following description of particular embodiments given by way of nonlimiting example in relation to the attached figures in which:

FIG. 1 schematically represents the structure of a module of a lighting or display device according to an embodiment of the invention.

FIG. 2 schematically represents the trend of the current at the terminals of the lighting or display module or device as a function of its operating mode according to an embodiment of the invention.

Figure 6:
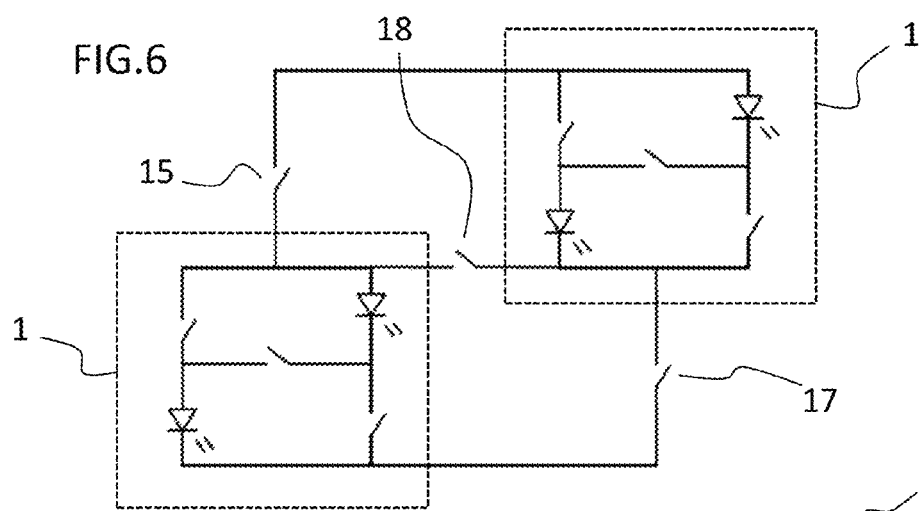

FIG. 6 schematically represents the structure of a subassembly of two modules of a lighting or display device according to an embodiment of the invention.

Figure 7:
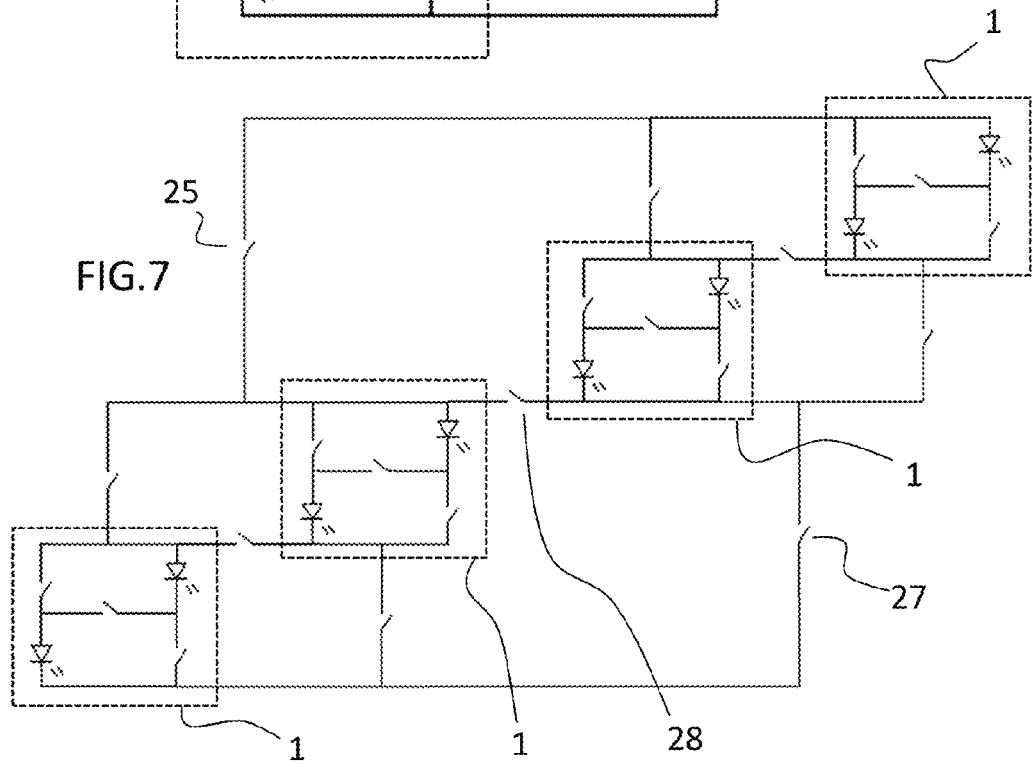

FIG. 7 schematically represents the structure of a subassembly of four modules of a lighting or display device according to an embodiment of the invention.

Figure 10:
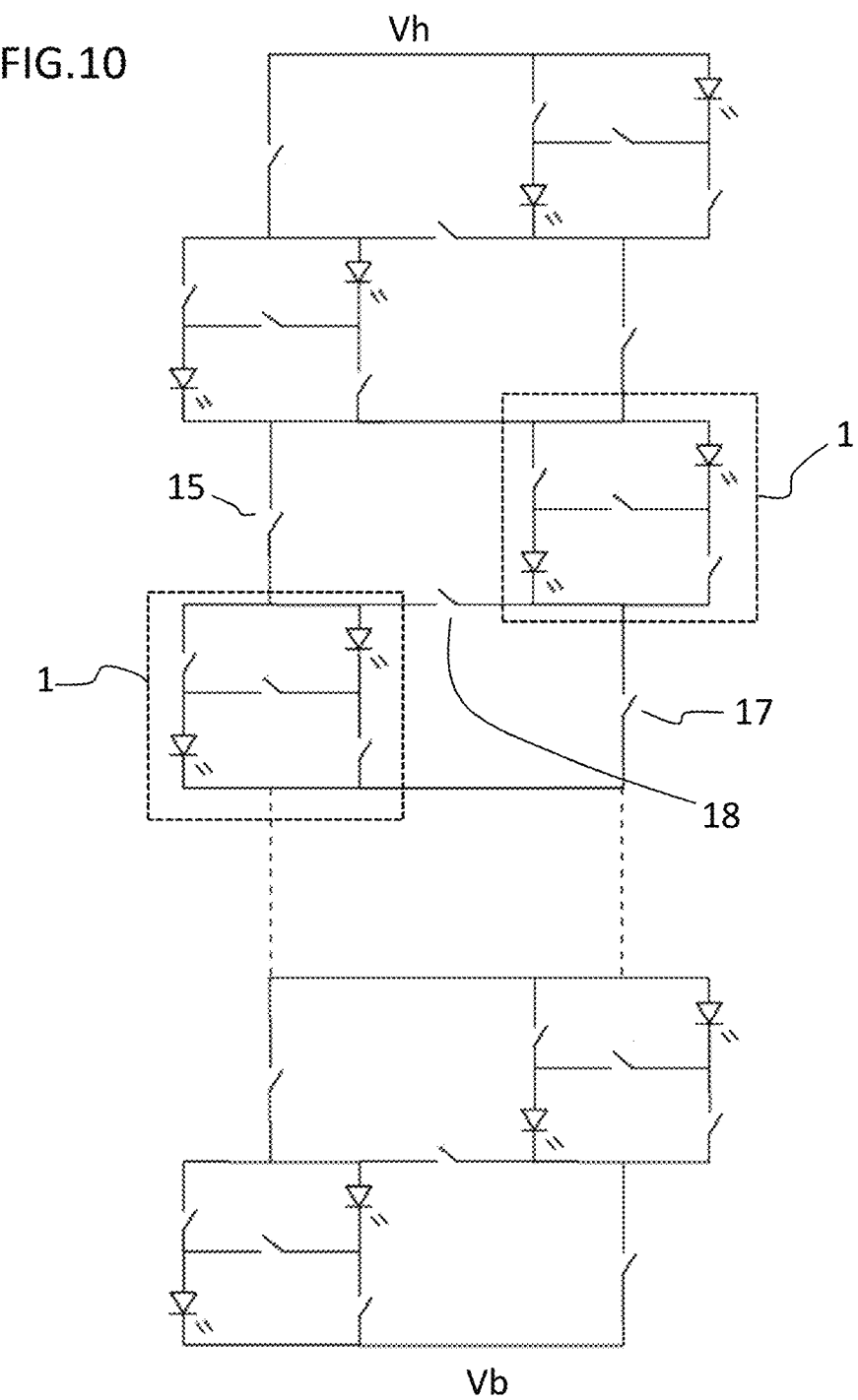

FIGS. 8 to 10 schematically represent lighting or display devices according to embodiments of the invention.

Figure 11:
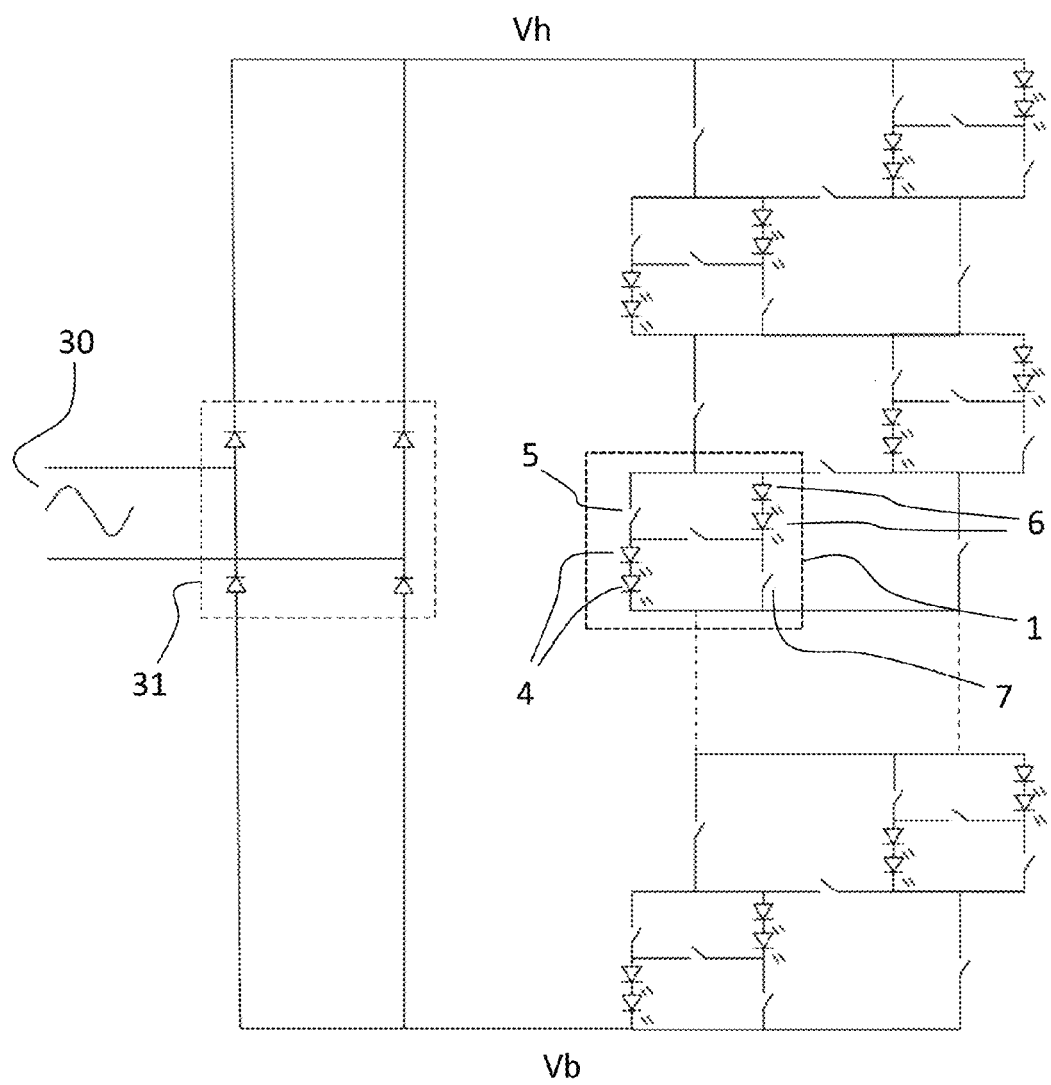
Figure 12:
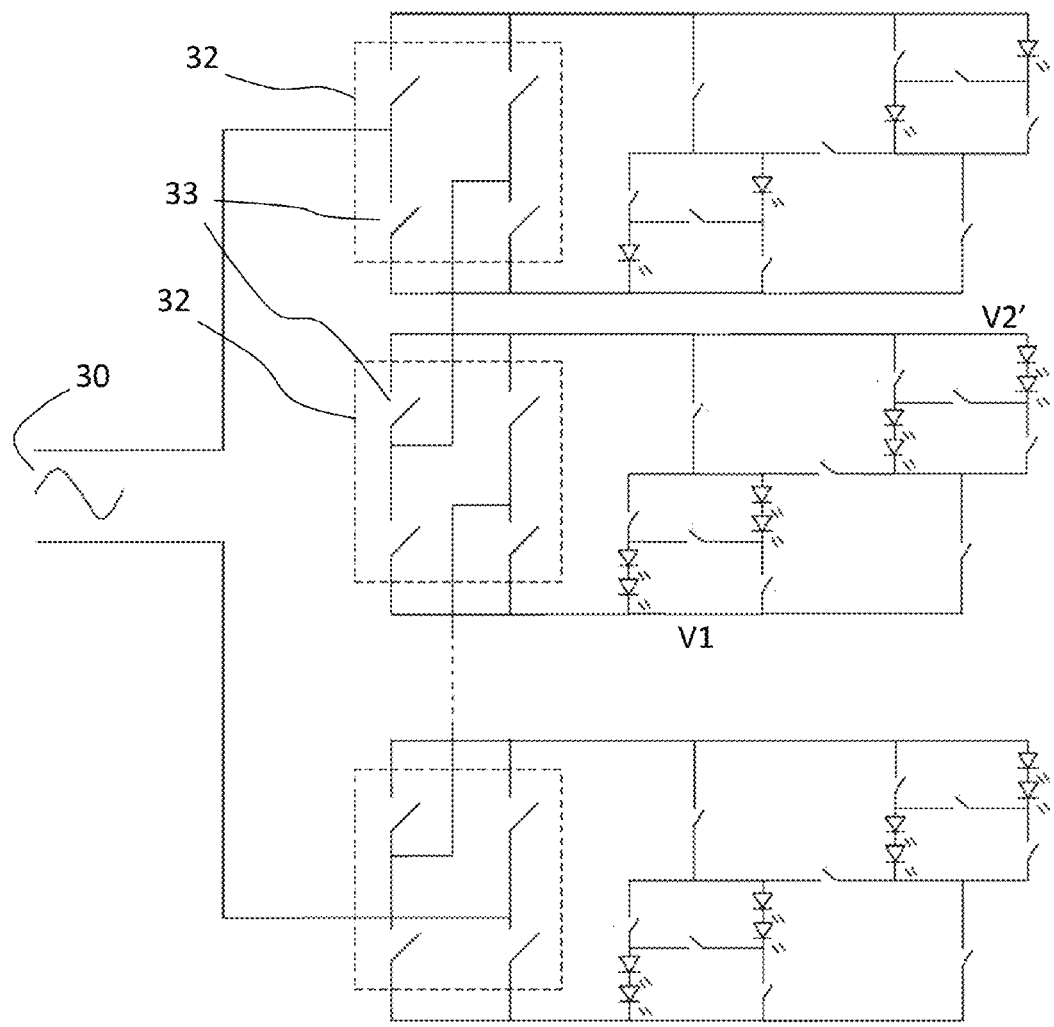

FIGS. 11 and 12 schematically represent connections to the mains of lighting or display devices according to embodiments of the invention.

Figure 13:
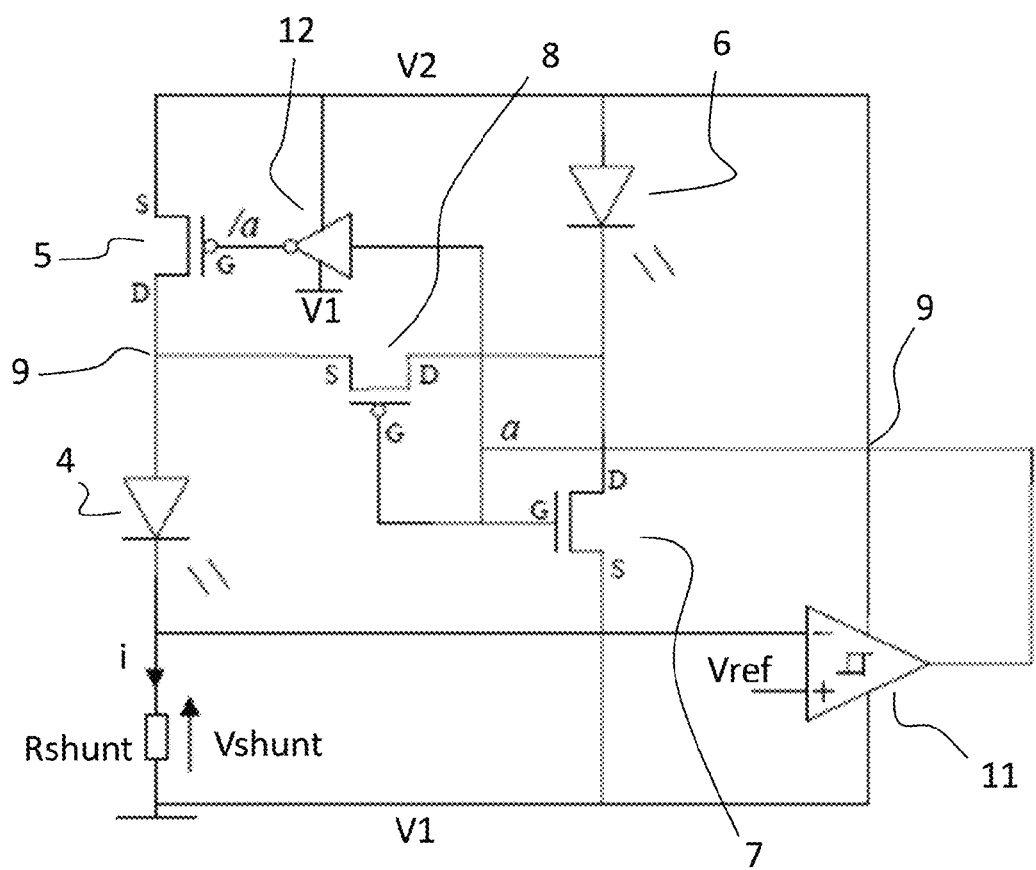

FIG. 13 represents the structure of a module of a lighting or display device with a control circuit for its switches according to an embodiment of the invention.

FIG. 14 represents the structure of a subassembly of two modules of a lighting or display device with a control circuit for its switches according to an embodiment of the invention.

FIGS. 15a to 15c represent comparators of the control circuit for switches of a lighting or display device according to an embodiment of the invention.

Figure 17:
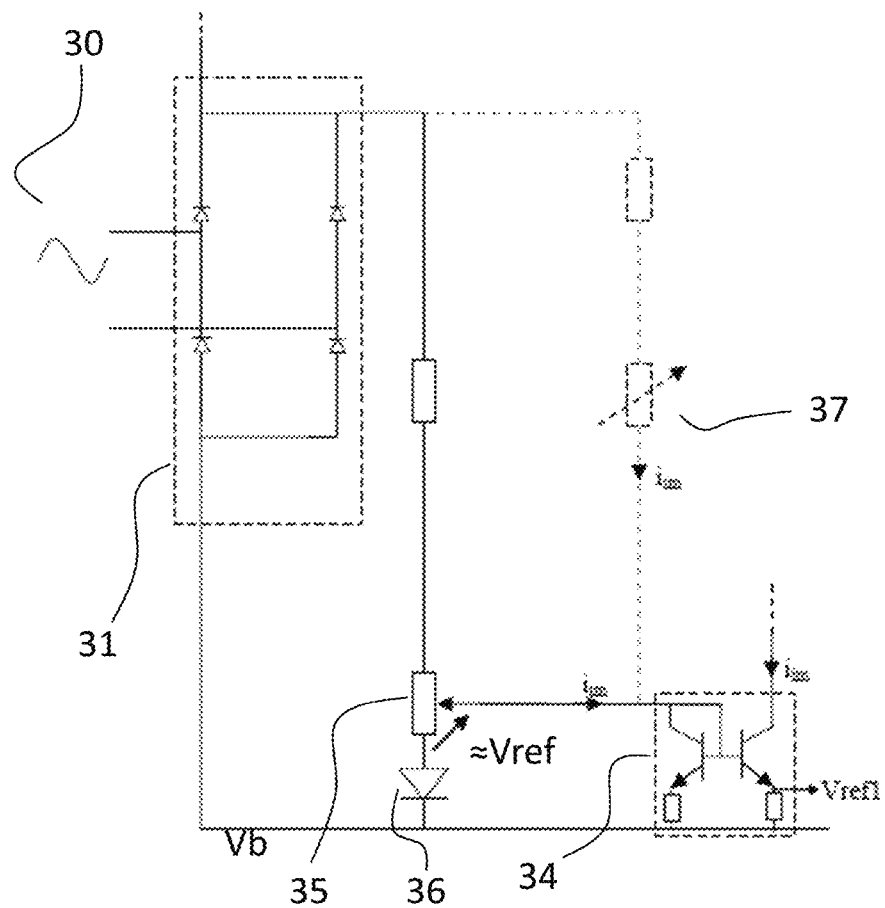
Figure 18:
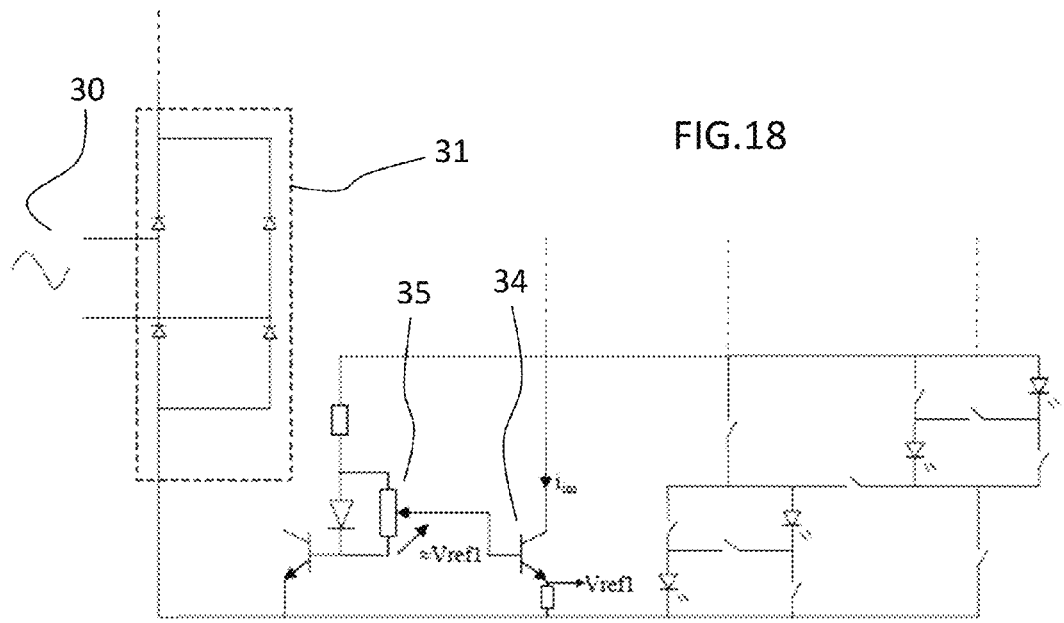

FIGS. 16 to 18 schematically represent connections to the mains of lighting or display devices with a circuit for transmitting a setpoint current according to embodiments of the invention.

Figure 19:
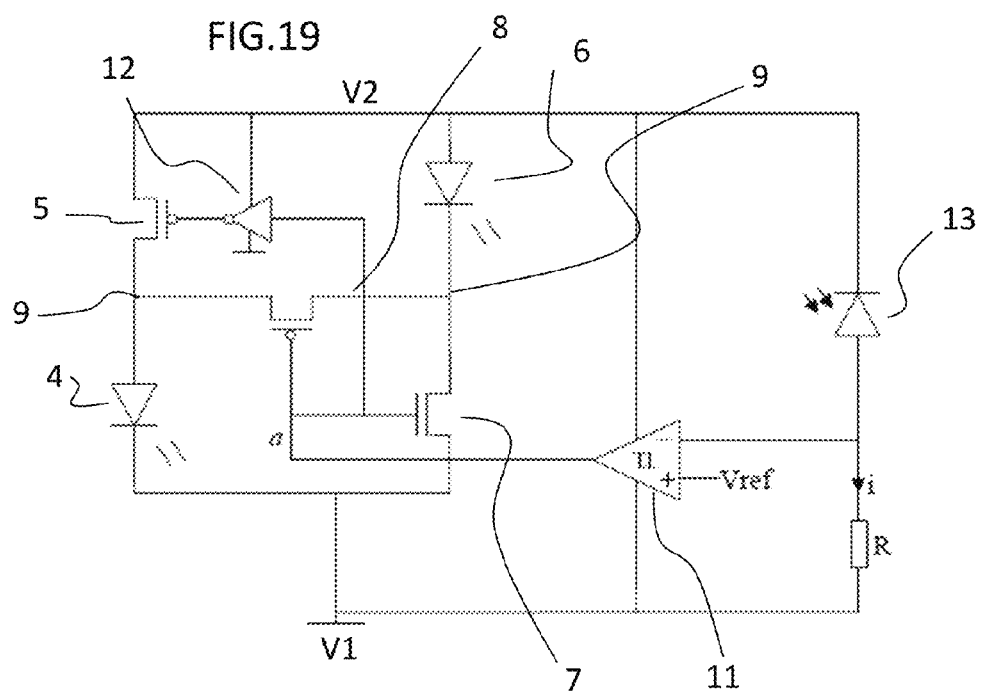

FIG. 19 represents the structure of a module of a lighting or display device with a circuit for controlling its switches by light intensity according to an embodiment of the invention.

Figure 20:
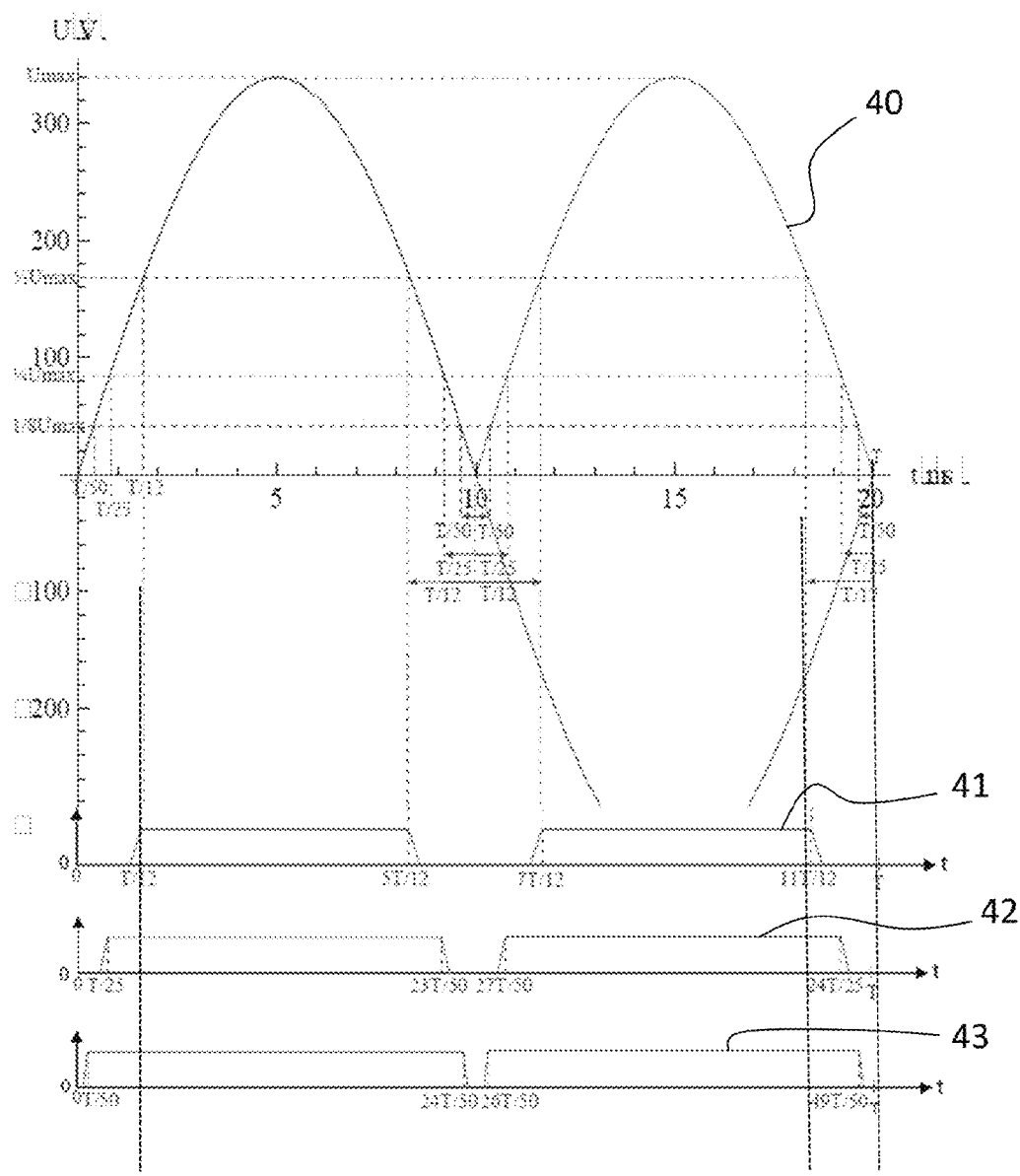

FIG. 20 represents the light intensity as a function of time supplied by a plurality of lighting or display devices from a rectified alternating power supply according to embodiments of the invention.

Figure 21:
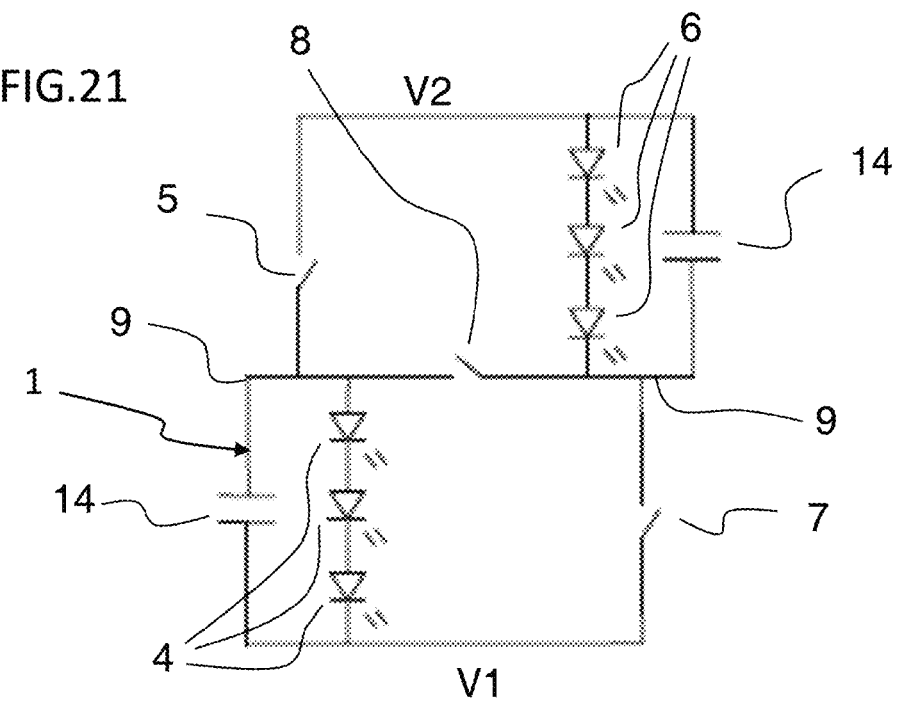

FIG. 21 schematically represents the structure of a module of a lighting or display device according to an embodiment of the invention.

Figure 22:
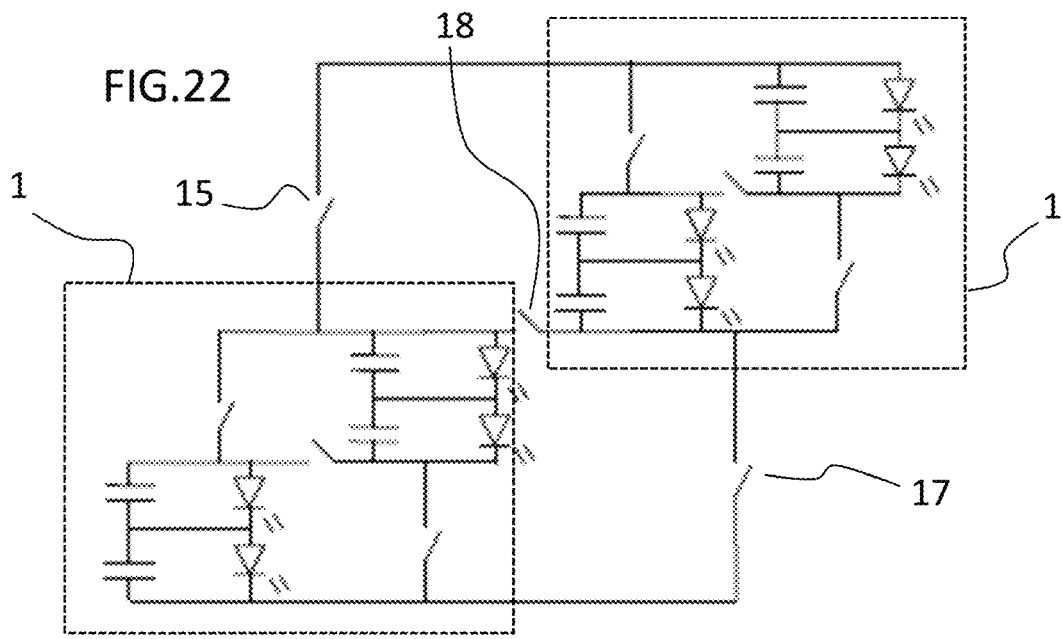

FIG. 22 schematically represents the structure of a subassembly of two modules of a lighting or display device according to an embodiment of the invention.

FIG. 23 schematically represents the structure of a solution for the electrical power supply of a lighting or display device according to an embodiment of the invention.

FIG. 24 schematically represents the structure of a subassembly of two modules of a lighting or display device according to an embodiment of the invention.

Figure 25:
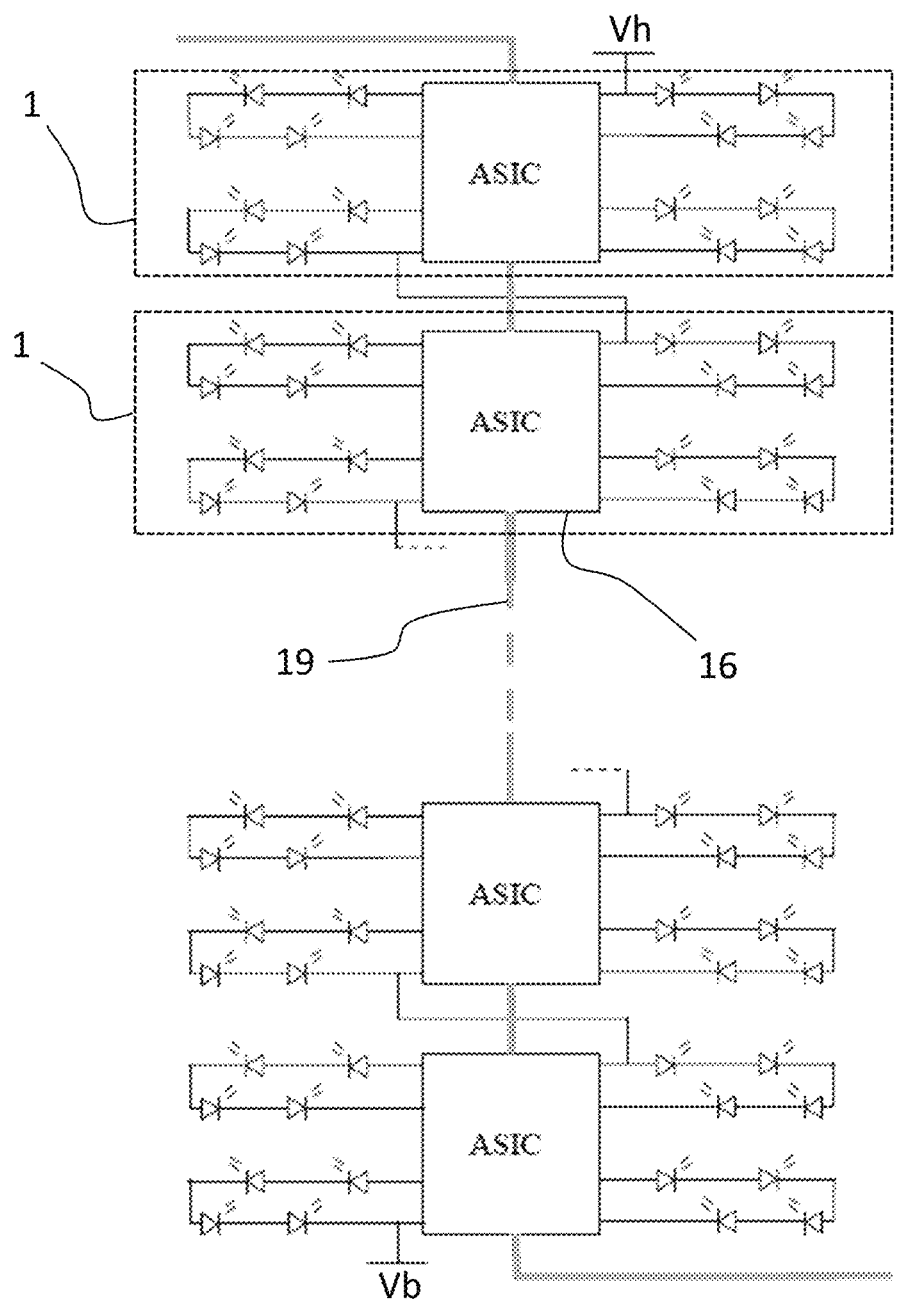

FIG. 25 schematically represents the structure of a lighting or display device according to an embodiment of the invention.

In the following figures, the same references will be used for identical or similar elements in each embodiment of the invention, in order to simplify the description. By convention, the qualifiers "upper" and "lower" will be used to designate the elements of the device in the direction of their series assembly.

In the embodiments of the invention, an LED lighting or display device is arranged with a structure made up of individual modules arranged in series, and provided with switches making it possible to modify the arrangement between the LEDs within each module, notably making it possible to modify the number of LEDs arranged in series or in parallel.

The benefit of such an architecture stems from the fact that each individual module exhibits a potential difference between its upper and lower terminals, which can be chosen with any advantageous value, lower than the overall power supply voltage, which makes it possible to simplify the components used, while simplifying their control, as will be illustrated.

Figure 1:
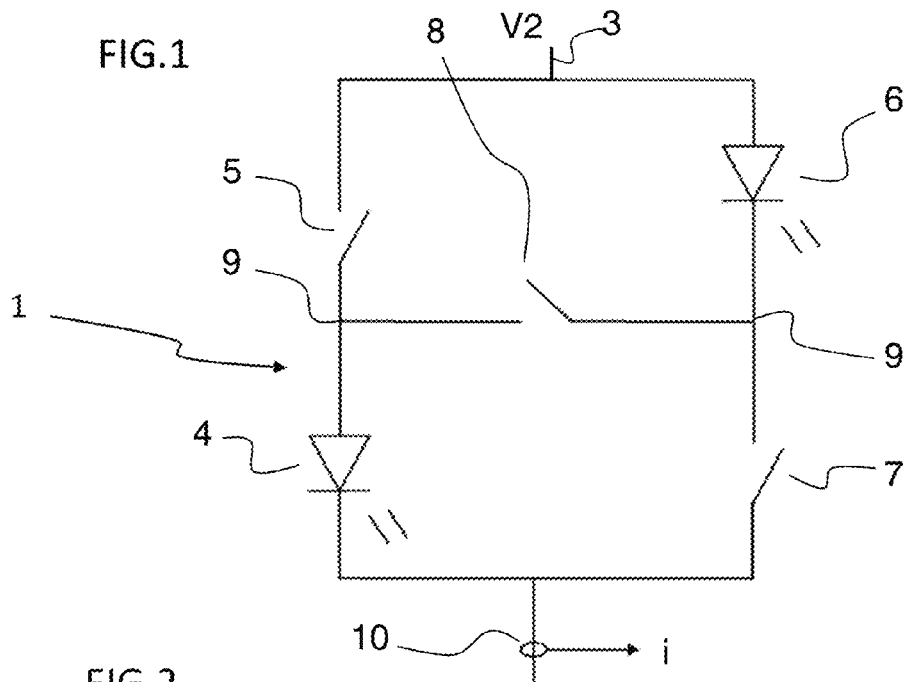

By way of example, FIG. 1 represents an individual module 1 according to an embodiment of the invention. This module 1 comprises a first terminal, to be called by convention lower terminal 2, which is intended for an electrical link with a lower neighbouring module, and a second terminal, to be called by convention upper terminal 3, intended for a series link with an upper neighbouring module. Between these two terminals 2, 3, of respective potentials V1 and V2, the module 1 comprises two parallel branches, on which are respectively arranged, in order, from lower to upper: an LED 4 and a switch 5 arranged in series on the first branch, and a switch 7 and an LED 6 arranged in series on the parallel second branch. Furthermore, an intermediate branch comprising an intermediate third switch 8 links the two intermediate terminals 9 arranged on each of the two parallel branches between the LED 4, 6 and the switch 5, 7. These switches 5, 7 will be called "series switches". Finally, the module 1 is advantageously provided with a current sensor 10 which measures the current i passing through the module.

The invention relates also to a method for managing a lighting or display device comprising a plurality of modules as described above, linked in series. Such a method notably comprises the following steps:
  if i>iref, then the two first switches 5, 7 are open and the intermediate switch 8 is closed, to position the two LEDs 4, 6 in series;
  if i<iref, then the two first switches 5, 7 are closed and the intermediate switch 8 is open, to position the two LEDs 4, 6 in parallel,
where iref represents the value of a reference current, chosen for the regulation of the operation of the module. Preferably, this reference current iref is set at the nominal current value which allows for the lighting of the LEDs. The module thus operates according to two possible configurations, two modes of operation, called "series" and "parallel", to adapt to the variations of the current passing through it, induced by the current source to which the lighting or display device is linked.

The parallel arrangement of the two LEDs 4, 6 leads to an increase in the current i passing through the module 1, which then tends to return it above the current iref, in which case the two LEDs 4, 6 will be positioned in series. This change causes a lowering of the current i: when it returns below iref, the two LEDs 4, 6 are positioned in parallel. The preceding cycle is thus reproduced. To avoid excessively frequent oscillations and an instability, notably if the current i is close to the reference current iref, a circuit is associated with such a module to limit these oscillations, and provoke, for example, a processing of hysteresis type.

Figure 2:
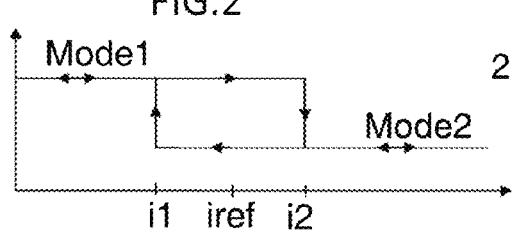
Figure 3:
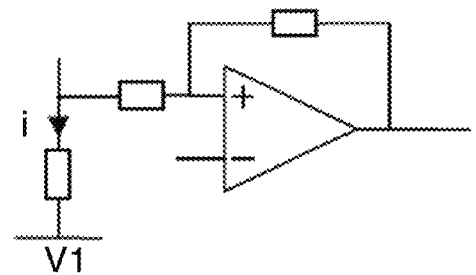
FIG. 3 represents a first circuit that makes it possible to implement the trend of the current according to FIG. 2 according to an embodiment of the invention.
Figure 4:
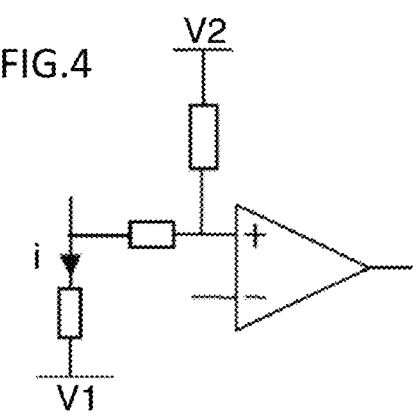
FIG. 4 represents a second circuit that makes it possible to implement the trend of the current according to FIG. 2 according to an embodiment of the invention.

Such a solution, illustrated by FIG. 2, shows the trend of the mode of operation of the module 1 as a function of the current iref in the module 1. Two current values i1 and i2 are set, distributed around the reference value iref. In this approach, a higher current threshold i2 is imposed if the module is in parallel mode 1, that is to say that the two LEDs 4, 6 are arranged in parallel, and a lower current threshold i1 is imposed if the module is in series mode 2, that is to say that the two LEDs 4, 6 are arranged in series. Such behaviour can be obtained from a circuit such as that represented in FIG. 3. As a variant, the circuit of FIG. 4 can be used, which adds an offset relative to the measurement of the current i, this offset being all the higher when the difference between the potentials V2 and V1 is high: this makes it possible to lower the value of the threshold current as the voltage difference increases, that is to say during the changeover to series mode 2, and, conversely, when the difference between the potentials V2 and V1 decreases.

Figure 5:
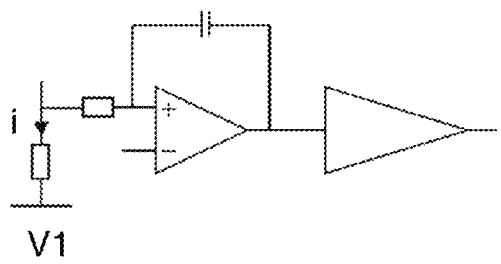
FIG. 5 represents a third circuit that makes it possible to implement the trend of the current according to FIG. 2 according to an embodiment of the invention.

According to another variant, the oscillations between the two modes of the module are authorized, but with a limited oscillation frequency. The circuit of FIG. 5 makes it possible to implement such a limitation.

Naturally, other variants are possible to prevent the excessively frequent changeovers from one mode to the other, or to avoid the switch to a linear control mode. In certain cases, such linear operation may be sought, for example when the voltage V2-V1 available between the terminals 2, 3 of the module 1 is greater than the minimum voltage of an LED, but less than the minimum voltage of two LEDs: in such a case, one solution may consist in positioning the intermediate switch 8 in open position, and the other two switches 5, 7 in semi-open position to fulfil a current regulating/limiting function.

In effect, the two switches 5, 7 of the two parallel branches of the module 1 can fulfil a current limiting function, to secure the operation of the LEDs 4, 6. Such switches can be controlled switches such as bipolar transistors or MOS transistors.

FIG. 6 illustrates, by way of example, the association of two individual modules 1, each having an architecture identical to that described previously. According to a first simplest link, not represented, these two modules 1 could simply be arranged in series, by an electrical link between the upper terminal of the lower module and the lower terminal of the upper module.

In this embodiment, such a series link is produced, on which a so-called "series switch" 18 has been arranged, according to an advantageous optional option. In addition, advantageously, this association also comprises a first additional electrical link between the two lower terminals of the two modules, on which a lower switch, called first parallel switch 17, is positioned, and a second additional electrical link between the two upper terminals of the two modules, on which an upper switch, called second parallel switch 15, is positioned. Such an electrical linking of two modules, using three links and three switches 15, 17, 18, offers the advantage of making it possible to position the two modules either in series, by closing the series switch 18 and by opening the two parallel switches 15, 17, or in parallel, by opening the series switch 18 and by closing the two parallel switches 15, 17.

Since each module also makes it possible to position its two LEDs either in series or in parallel, it thus appears that the four LEDs of this subassembly of two modules can ultimately occupy multiple different configurations. This architecture affords a significant versatility for its management, which can make it possible to reach, for example, four different voltage values between the upper terminal of the upper module, of potential V2', and the lower terminal of the lower module, of potential V1, according to the following exemplary configurations:

in a first configuration, the two modules are arranged in parallel, and the two LEDs of each module are also arranged in parallel. This ultimately makes it possible to achieve an assembly comprising four LEDs arranged in parallel. As a variant, some of these LEDs can be disconnected from the set by simply opening the series switch arranged on its branch. Thus, such a subassembly can offer from one to four LEDs on parallel branches between its two terminals, upper and lower;

in a second configuration, the two modules are arranged in series and their respective LEDs are arranged in parallel. As a variant, an intermediate switch of a module and one of the parallel switches 15, 17 can also be closed, and not open;

in a third configuration, three LEDs can be arranged in series, by choosing a series linking of the two modules and by disconnecting one of the LEDs of one module or by arranging the LEDs of this module in parallel;

in a fourth configuration, the four LEDs can be linked in series.

This principle can naturally be extended to a multitude of modules linked together, like the association of four modules illustrated by FIG. 7. In this illustrated example, the device is constructed by the assembly of two subassemblies of two modules having an architecture as illustrated in FIG. 6. These two subassemblies are linked together via three electrical links and three switches 25, 27, 28, in a manner similar to the association between two modules, described previously, to make it possible to have these two subassemblies in series or in parallel.

Naturally, this approach makes it possible to imagine a very large number of variant embodiments. In effect, each individual module can be in a different form, with a different number of LEDs and/or a different electrical link between the LEDs. It can, for example, comprise more than two parallel branches, comprising any number of LEDs, and at least one series switch. The different individual modules of the device may or may not be identical.

Furthermore, the electrical link between the different modules may be more or less simple, and may comprise or not comprise switches to make it possible to modify or not modify their links. In all cases, the modules or the subassemblies can be arranged in series.

In all cases, the assembly offers the advantage that, within each module, the electronic components, like the switches, are arranged between two terminals of relatively low potential difference, less than the overall potential difference Vh−Vb of the device, which makes it possible to use simple and inexpensive components.

FIGS. 8 to 10 thus illustrate three LED lighting or display devices according to different embodiments.

The embodiment illustrated in FIG. 8 consists of a simple series assembly of a multitude of individual modules 1 as described with reference to FIG. 1.

The embodiment illustrated by FIG. 9 consists of an assembly of individual modules 1 different from those presented in the preceding embodiments. In effect, each module is obtained by replacing each LED 4, 6 of each parallel branch of the individual module 1 of FIG. 1 with six LEDs 4, 6 arranged on two parallel branches each comprising three LEDs, arranged between, respectively, a lower terminal and an upper terminal of the module and the intermediate terminals 9 of the module.

The embodiment represented by FIG. 10 finally illustrates a series assembly of groups of two individual modules 1 as illustrated by FIG. 6.

FIG. 11 represents the direct linking of an LED lighting or display device with an alternating voltage source 30, like the conventional 240 Vrms mains. This link is made via a rectifier bridge 31, which can either comprise conventional diodes supporting the peak voltage supplied by the source 30, or by using controlled switches to limit the voltage drop in the on state. It should be noted that, in this embodiment, the LED lighting or display device comprises the series association of subassemblies consisting of two individual modules 1, assembled together according to the approach explained with reference to FIG. 6. However, in this embodiment, each individual module 1 comprises two LEDs 4, 6 in series on each parallel branch, and not just one.

FIG. 12 illustrates a variant connection of the same LED lighting or display device with an alternating voltage source 30, in which the rectifier bridge is distributed over each subassembly of two individual modules 1. The rectifier bridge function is thus fulfilled by a multitude of rectifier bridges 32. The advantage of this approach is that each switch 33 of the rectifier bridges 32 is subject only to a reduced voltage compared to those of the rectifier bridge 31 of FIG. 11, more specifically the voltage V2'-V1 which represents the voltage at the terminals of a subassembly. This embodiment thus makes it possible to use simpler and less expensive components. These components can be simple diodes or controlled switches. In the case of controlled switches, the position of the switches (closed or open) can be determined simply from the sign of the voltage at the terminals of the device or even from the sign of the current passing through it.

According to a variant embodiment, an H-configuration bridge can be associated with the LED lighting or display device, and/or at the level of subassemblies of such a device. Such an H-configuration bridge makes it possible to shunt the structure on which it is mounted, which is useful, for example, in the case of failure of an LED or if the overall voltage is insufficient to power all the subassemblies of the device, even if these subassemblies are positioned in a favourable configuration, for example by arranging the LEDs of each individual module in parallel in the embodiment illustrated.

In such a situation where H-configuration bridges are used to shunt one or more subassemblies of the LED lighting or display device, a method for managing such a device can comprise a step consisting in alternating the shunted and non-shunted subassemblies, such that all the LEDs of the LED lighting or display device ultimately see a substantially identical average current. The alternation of these shunts is advantageously implemented at a frequency greater than retinal persistence, for example greater than 50 Hz.

According to an advantageous embodiment of the invention, the switches used are transistors and a control device is arranged so as to generate control voltages for these transistors from potentials close to the reference potentials of these transistors.

FIG. 13 thus illustrates an individual module 1 according to the architecture of FIG. 1, but detailing its electrical circuit allowing an advantageous control of the switches 5, 7 and 8 which are of MOS (PMOS and/or NMOS) transistor type. This circuit is incorporated in the individual module between the potentials V1 and V2. The transistors therefore do not need to support a high voltage. Advantageously, a voltage lower than 50 V is chosen, notably when the device is linked to the electrical network. The circuit comprises a comparator 11 and an inverting gate 12.

The operation of this electrical circuit will now be explained.

If the voltage Vshunt at the first input of the comparator 11 is lower than a reference voltage Vref applied to the comparator, then the output of the comparator 11 changes to the logic level "1" and the output voltage at the point a takes the high value V2. The inverting gate 12 changes to the logic level "0" and its output voltage /a takes the value V1. The result thereof is that the series switches 5, 7 are closed and the intermediate switch 8 open. The module is in parallel mode.

If the voltage Vshunt between the first input of the comparator 11 and the low voltage V1 is higher than the reference voltage Vref applied to the comparator, then the output of the comparator 11 changes to the logic level "0" and the output voltage at the point a takes the high value V1. The inverting gate 12 changes to the logic level "1" and its output voltage/a takes the value V2. The result thereof is that the series switches 5, 7 are open and the intermediate switch 8 closed. The module is in series mode. It should be noted that the embodiment described above makes it possible to take into account an electrical measurement on the first branch of the module. As a variant, this measurement can be global, over the two branches of the module, as represented in FIG. 1.

Such an approach is, for example, compatible with the use of LEDs with 3 V operating voltage, with a comparator operating in a voltage range of the order of 2 to 36 V, and an inverting gate operating over a voltage range of 3 to 15 V, and all for a device connected to the standard electrical network.

Naturally, variant embodiments can be envisaged. An integrated circuit comprising all these components and dedicated to the application can be provided. Other electrical components could be envisaged. For example, the inverting gate can be produced using a single transistor and a pull-down resistor. The switches can be any other type of transistor such as bipolar, FET, JFET, IGBT, CMOS, and other such transistors, based on a silicon substrate, of silicon carbide, gallium nitride, gallium arsenide, silicon-germanium, etc.

A microcontroller can be used in each module or subassembly, that is to say a group of modules, to manage the method for managing said subassembly. For that, the management method can comprise the following steps:
  digitization of the value of the current i;
  computation of the configuration of the switches as a function of the current and, optionally, as a function of the temperature and/or of a setpoint supplied by a user;
  transmission of a command to one or more switches.

This communication can be implemented by the microcontroller by the generation of signals using the PWM (Pulse Width Modulation) technique.

FIG. 14 describes in more detail an architecture of a subassembly according to FIG. 6, including the electrical control circuits of the switches, complementing the approach explained above. Each individual module 1 is provided with a circuit as described above, each comprising a comparator 11 and an inverting gate 12. The assembly also comprises a third comparator 21 and a third inverting gate 22 to drive the three switches 15, 17, 18 arranged between the two modules. The three comparators 11, 21 are represented separately by the three FIGS. 15a, 15b, 15c to avoid cluttering up FIG. 14. All these electronic components are linked to the subassembly represented to operate in voltages lying between the lower voltage V1 of the lower module and the higher voltage V2' of the upper module, therefore according to a voltage defined by the two neighbouring modules of the subassembly.

In the embodiments described above, it therefore appears that the switches internal to the architectures described are driven by control circuits arranged within the modules and/or between the modules, to operate with a low voltage at their terminals, originating from the voltage between the upper and lower terminals of a module or between two terminals of neighbouring modules. This local control of the switches, by a locally powered circuit, makes it possible to do away with the use of energy external to the device, and notably advantageously to avoid the use of an external power, powering an at least partially external control, for example centralized, which would necessitate the implementation of galvanic insulation because of the use of an external power involving a reference potential which could differ too much from the reference potential of the control of the switches of the module (for example, the gate potential, for a transistor of conventional MOSFET type, cannot generally be plus or minus 20 V away from the source potential and even less for transistors in thinner technology). The reference potential of the external power cannot be close to the reference potential of each module since two distant modules naturally exhibit very different reference potentials (difference easily greater than 25 V). Reference potential should be understood here to mean either the reference potential of the transistor to be controlled (the source in the case of a MOSFET technology, the emitter in the case of a bipolar technology, etc.), or the so-called ground "GND" potential of the electronics considered, which, in the case of a power supply by the voltage of the module, is naturally very close to the reference potential of the transistors to be controlled (deviation less than 20 V), which makes it possible for these electronics to apply a control directly to the transistors of the module without passing through a galvanic insulation (controlling the gate-ground voltage makes it possible to easily control the gate-source voltage if the source-ground voltage is relatively low).

Advantageously, the embodiment also implements a progressive trending of the change of configuration of the subassembly, notably between an all-parallel mode and an all-series mode, by a gradual changing of the different switches. This gradual trending can be implemented by one of the following solutions:

- the reference values Refa, Refb and Refc of the three comparators 11, 21 are identical and the technological dispersion of the comparators alone, for example over their internal offset voltage, is sufficient to obtain their staggered switching; or
- the three reference values are chosen to be different, but close to the desired setpoint value, obtained by the calculation I*Rshunt; or
- the reference values Refa, Refb and Refc of the three comparators 11, 21 are identical and three hysteresis comparators are used, whose hysteresis values differ.

In the case of the series arrangement of a plurality of subassemblies such as that of FIG. 14, it may be advantageous in certain cases to take into account the state of the neighbouring device to establish the reference values. In effect, if there is a desire for example to authorize a substantially higher overall current when the number of LEDs in parallel is high, and vice versa, the switching thresholds must be reduced rapidly as soon as just one of the devices begins to position itself in series mode (presents fewer LEDs in parallel) and restore a higher threshold as soon as all of the devices present a higher number of LEDs in parallel. In practice, knowing the state of one or two neighbouring subassemblies can be sufficient, the parallel/series progression then being performed step by step.

The reference voltage is generated by a circuit not represented in FIGS. 14 and 15. For that, an existing circuit making it possible to generate a reference voltage of, for example, 0.4 V from a power supply voltage of 1.4 V to 18 V can be chosen. From a certain reference voltage, another reference can be obtained, for example via a divider bridge. As a variant, this reference voltage can be obtained by simply the threshold voltage of a diode. According to another variant, this reference voltage can be an internal reference voltage of the comparator. It is possible, as a variant, to provide for the use of a voltage proportional to the rectified power supply voltage.

According to a variant embodiment, the reference voltage can be generated and/or adjusted from an external control, notably by a control from a user who wants to modify the lighting in order to adjust it to suit him or her. The reference voltage can be obtained by the translation into an analogue value, which serves as reference, of a radio frame recovered by a radio module. It can, as a variant, be obtained by information transmitted by carrier current over the power supply line of the lighting. According to another variant, a potentiometer or a coder directly actuated by a user can be implemented. As a variant, a communication bus, possibly galvanically insulated, allows the transmission of this information. Finally, this reference voltage could be deduced from a source of digital information, translated into light intensity variation form, for example to produce a wireless optical communication (LiFi).

According to one embodiment, the voltage reference can self limit, notably as a function of the temperature and more particularly in case of temperature rise, and/or as a function of presence of external light.

In all the embodiments, the management of the LED lighting or display device can be based on a setpoint transmitted in the form of a setpoint current, then used for the generation of a reference voltage. FIG. 16 represents an LED lighting or display device connected to the mains 30, comprising a particular circuit for the transmission of the reference voltage values, from a setpoint current $i_{im}$. This overall setpoint is supplied by a user, either directly, or via a setpoint voltage. In effect, this circuit comprises a basic chain of circuits 34 forming "current mirror" circuits, which transmit a current output $i_{im}$, equal to the incoming current. In this embodiment, each current mirror comprises bipolar transistors with emitter resistance. As a variant, MOS transistors could be used. To implement an embodiment with reference voltages Vrefi that are different for each subassembly i of the device, one solution is to choose different emitter resistances or to use imperfect current mirrors, to obtain slight current variations, which induce reference voltage variations. It should be noted, in this embodiment, that the power source is of three-phase type.

FIG. 17 illustrates a variant embodiment which makes it possible to adjust the value of the setpoint current $i_m$. This solution recovers a current at the output of the rectifier bridge 31 and generates a setpoint current by a potentiometer 35. This current is transmitted as input for the first current mirror circuit 34. The rest of the device is identical to that represented by FIG. 16 and is not reproduced in this FIG. 17. It should be noted that a diode 36 is arranged between the lower terminal potential Vb of the device and the potentiometer 35, to neutralize a voltage offset by the current mirror circuit 34. The voltage under the potentiometer 35 is thus close to the reference voltage Vref1 of the first subassembly of the device, which corresponds to a voltage proportional to the rectified mains voltage 30 from which the threshold voltage of the diode 36, negligible (approximately 0.6 V), is subtracted. It is therefore possible to consider that this embodiment makes it possible to obtain a reference voltage proportional to the rectified voltage. As a variant, a variable resistor 37 can simply be used between the rectifier bridge 31 and the first current mirror circuit 34, as represented by dotted line in FIG. 17.

Preferably, the setpoint current $i_{im}$ is chosen to be fairly low, notably very much lower than the current used for the lighting and/or display function, for example 100 times lower, to limit the energy consumption linked to the setpoint current transmission function.

FIG. 18 illustrates another embodiment for generating a setpoint current, in which a voltage offset is added from the switch-on voltage of a bipolar transistor.

FIG. 19 illustrates an individual module according to the architecture of FIG. 1, but detailing its electrical circuit allowing an advantageous control of the switches 5, 7 and 8, which are of MOS (PMOS and/or NMOS) transistor type, with an approach that is different to FIG. 13, since the driving of the switches is implemented on the basis of a light intensity. The operation of this circuit is very similar to that explained with reference to FIG. 13, from a control current generated by a photodiode 13 which generates a current i that is a function of the light intensity.

FIG. 20 illustrates the curve 40 of variation of the voltage as a function of time obtained at the output of a rectifier bridge 31 connected to the mains 30, having a 240 Vrms 50 Hz power supply. The curve 41 illustrates the light intensity as a function of time obtained by a lighting device comprising a plurality of individual modules 1 according to FIG. 1 arranged in series, connected to such a rectifier bridge 31. The curve 42 illustrates the light intensity as a function of time obtained by a lighting device connected to such a rectifier bridge 31, comprising a plurality of subassemblies in series, each subassembly comprising two individual modules 1 according to an assembly represented by FIG. 6. The curve 43 illustrates the light intensity as a function of time obtained by a lighting device connected to such a rectifier bridge 31, comprising a plurality of subassemblies in series, each subassembly comprising four individual modules 1 according to an assembly represented by FIG. 7. In all cases, the lighting device is dimensioned to obtain the lighting of all the LEDs when they are in series and subjected to the peak voltage Umax. Since the voltage of the power source passes through a zero value, there are, in all cases, periods during which the power supply voltage is insufficient to light the LEDs of the lighting and/or display device, even when the device adapts by arranging all its LEDs in parallel. The more the device comprises modules that can be placed in series or in parallel, the more it can mitigate this drawback. However, it should be noted for example that the curve 41 indicates a lighting over a duration representing 67% of the time, the curve 42 indicates a lighting over a duration representing 84% of the time and the curve 43 indicates a lighting over a duration representing 92% of the time. In certain cases, these interruptions of the lighting may be perceptible and uncomfortable, and may generate a flicker-type effect.

To mitigate this drawback, one embodiment relies on the addition of an energy storage component in parallel with all or some of the LEDs, within the device. Such a storage component can be arranged at the level of each LED, or of a group of LEDs, and/or at the level of an individual module, or of a subassembly of modules. In addition, such a storage component can be of any type, such as a battery, a capacitor, or a supercapacitor. The use of a battery may also eliminate the flicker effect, and make it possible to maintain the lighting in the event of a power outage.

Thus, FIG. 21 illustrates an individual module 1 according to such an embodiment. This individual module 1 also comprises an architecture arranged between two link terminals, of respective potentials V1 and V2. Furthermore, it comprises two parallel branches and a link between them linking their two intermediate terminals 9, this link comprising an intermediate switch 8. Each branch comprises an assembly of three LEDs 4, 6 arranged, respectively, between the lower terminal of potential V1 and the intermediate terminal and between the intermediate terminal and the upper terminal of potential V2. A storage component 14, in the form of a capacitor, is arranged in parallel to these three LEDs 4, 6 on each parallel branch. Beyond the intermediate terminal 9, each parallel branch also comprises a parallel switch 5, 7.

FIG. 22 illustrates a subassembly comprising two individual modules 1 linked together by three links and three switches 15, 17, 18, enabling them to be linked in series or in parallel, as explained with reference to FIG. 6. In this embodiment, each individual module comprises two LEDs and two capacitors, in parallel to the LEDs, on each parallel branch.

In all cases, the energy storage components recharge during the periods when the voltage is sufficiently high, then take over to power the LEDs when the input voltage is no longer sufficient to supply the necessary minimum current.

FIG. 23 represents an alternative approach, in which a storage component 44 is arranged in parallel to the rectifier bridge 31. This storage component, a capacitor in this embodiment, slows down the drop in the power supply voltage of the LEDs such that this voltage never drops below the minimum power supply voltage of the lighting and/or display device, thus guaranteeing continuous lighting.

The different embodiments have demonstrated the advantage of the modular architecture through the series arrangement of a plurality of modules of the lighting device. As a variant, such modules can be arranged in parallel, as illustrated by FIG. 24. In effect, two individual modules 1 as represented in FIG. 1 are identified in this figure. As a variant, this architecture can be considered as a single individual module comprising four parallel branches, each comprising an LED and a series switch. Such an approach could for example be implemented in a display, by using a structure with three parallel modules each respectively comprising red, blue and green LEDs to obtain all the desired colours. The device will then be constructed by the series assembly of such subassemblies.

FIG. 25 represents a lighting and/or display device comprising a plurality of individual modules 1 connected in series. Each module 1 comprises an electronic circuit 16 of ASIC type, incorporating all the electronic functionalities of the module, notably the switches and their control elements. Optionally, the different ASICs can be linked by a communication line 19, via which a setpoint may for example pass for the management of the device. As a variant, a rectifier bridge and/or an H-configuration bridge may be incorporated in each ASIC. In this embodiment, each ASIC is subject to a limited voltage, which is the voltage between the two terminals of its module.

The invention relates also to a method for managing a lighting and/or display device as described previously. This method comprises the following steps:
- determination of the number of LEDs to be arranged in series and/or in parallel in the modules and/or subassemblies that make up the device;
- determination of the position of the switches and transmission of a command to open or close the switches on the basis of the preceding determination, this command being generated by a control circuit for said switches powered by a low-voltage potential difference corresponding to the potential difference between the lower terminal and the upper terminal of the module comprising the switches or the potential difference between a terminal of said module and a terminal of a neighbouring module.

According to the embodiment, the management method comprises the following actuations of the switches of a module of the device:
- closure of the switches arranged on a vertical branch between the lower and upper terminals of a module of the device, and opening of a switch arranged on a transverse intermediate branch respectively linking the intermediate terminals arranged between the LED and a switch of each of the two vertical branches, to arrange the two LEDs of the module in parallel, or
- opening of the switches arranged on a vertical branch between the lower and upper terminals of a module of the device, and closing of a switch arranged on a transverse intermediate branch respectively linking the intermediate terminals arranged between the LED and a switch of each of the two vertical branches, to arrange the two LEDs of the module in series.

Advantageously, the method for managing the lighting and/or display device according to an embodiment comprises the series connection of LEDs of a module when the power supply current exceeds a certain threshold, and a parallel connection of LEDs of a module when the power supply current is below a certain threshold.

The method for managing the device may also comprise the following steps:
- measurement of at least one quantity on a module of the device;
- transmission of the measured quantity to at least one computer;
- determination of the position of the switches of the module by taking into account the measured quantity.

The lighting or display device of the invention can be managed by an intelligent unit, a computer or processing circuit, local and/or remote and accessible by a local communication device, this computer being able to comprise any software and/or hardware element to manage the device, notably to determine the configuration of its switches. For that, the device can incorporate any actuation means, any control circuit for its switches incorporated in a module and/or a plurality of neighbouring modules so as to have, at its terminals, a low-voltage potential difference corresponding to the potential difference between the lower terminal and the upper terminal of said module or the potential difference between a terminal of said module and a terminal of a neighbouring module.

The invention is of particular interest for connecting an LED lighting or display device to the electrical mains, or from a source of variable voltage, originating for example from an alternator set in motion at variable speed, such as from a mini-wind turbine, or from a bicycle dynamo, a hand-cranked lamp or from a battery pack whose voltage varies with its state of charge, from solar cells whose voltage depends on exposure to sunlight. It also offers the advantage of allowing a device to be connected to any power supply, the 240 Vrms and 50 Hz or 120 Vrms and 60 Hz mains as well as a 12 V or 24 V battery.

The invention can be applied to any LED lighting, or display, or projection device. Here, the term "light-emitting diode (LED)" includes the various technologies, such as organic light-emitting diodes (OLED), polymer light-emitting diodes (PLED), PHLEDs, etc. As a variant, it could also suit a display device comprising numerous conventional low-voltage incandescent bulbs or any other low-voltage lighting element (notably for voltages of less than or equal to 50 V). It is therefore suited to assemblies of low-voltage individual lighting components, such an individual lighting component being in the form of a standalone physical entity, comprising a light source with an enclosure and connectors for its electrical link, like a bulb, incandescent or LED.

Thus, it is of interest for a headlamp of a transport conveyance, such as a bicycle, a motorbike, a car, a bus, a train, a tram, an underground train, etc. It can also be implemented for public lighting, in a street lamp, a bus shelter, an underground station, etc. It can be useful for hand held lamps, such as a pocket lamp, a torch, tent lighting, etc. It can also be used to produce decorative lamps, for spotlights, garden lighting, shop window lighting, indication lighting, landing lighting, etc. It can also be implemented for a headlight at sea, a vehicle emergency rotating light, for emergency exit lighting, etc.

The invention claimed is:

1. A lighting and/or display device with low-voltage individual lighting components, wherein the lighting and/or display device comprises:
   - a plurality of individual modules electrically connected together and being able to be arranged in at least one configuration, wherein the at least one configuration includes an arrangement in series,
   - at least one module among the individual modules comprising a lower terminal and an upper terminal, between which are arranged at least two individual lighting components and a plurality of switches connected together within the module, the switches being able to arrange the two individual lighting components in series or in parallel between the two lower and upper terminals,
   - at least another module among the individual modules comprising a lower terminal and an upper terminal, between which is arranged at least one individual lighting component, and
   - wherein each respective module among the at least one module and the at least one other module comprises a respective control circuit for switches of said respective module, each of the control circuits being connected to the device so as to have, at terminals of the control circuit, a low-voltage potential difference corresponding to a potential difference between the lower terminal and the upper terminal of said respective module or a potential difference between a terminal of said respective module and a terminal of a neighbouring module.

2. The lighting and/or display device according to claim 1, wherein the low-voltage individual components are light-emitting diodes (LED).

3. The lighting and/or display device according to claim 2, wherein the at least one individual module comprises:
   - a first branch extending between its lower and upper terminals and comprising, in order, at least one LED and a switch, a second branch parallel to the first branch between its lower and upper terminals comprising, in order, a switch and at least one LED, and an intermediate branch comprising an intermediate switch and respectively linking intermediate terminals arranged between the at least one LED and the switch of each of the two parallel branches.

4. The lighting and/or display device according to claim 1, wherein the at least one individual module comprises at least one sensor for measuring a quantity characteristic of a state of the individual module, and wherein the control circuit for the switches of the individual module controls them according to the measured characteristic quantity.

5. The lighting and/or display device according to claim 1, comprising a circuit for the transmission of a current setpoint to said at least one individual module.

6. The lighting and/or display device according to claim 1, wherein the control circuit for switches comprises a comparator and an inverting gate.

7. The lighting and/or display device according to claim 1, wherein the at least one individual module comprises at least one storage component which makes it possible to restore energy to at least one individual lighting component when a power supply voltage of the individual lighting component is insufficient for lighting.

8. The lighting and/or display device according to claim 1, wherein all the individual modules can be connected in series and comprise at least two LEDs and a plurality of switches, the switches being able to arrange two LEDs in series or in parallel.

9. The lighting and/or display device according to claim 1, comprising at least one of (i) switches arranged on three link branches between two neighbouring modules to allow the two neighbouring modules to be linked in series or in parallel and (ii) switches arranged on three link branches between two neighbouring subassemblies of the device, each subassembly comprising a plurality of individual modules, to allow the two neighbouring subassemblies to be linked in series or in parallel.

10. The lighting and/or display device according to claim 1, comprising at least one of (i) a rectifier bridge or a plurality of rectifier bridges each associated with a subassembly of individual modules to rectify the power supply voltage, and (ii) one or more H-configuration bridges making it possible to shunt at least one individual module in case of insufficient power supply voltage.

11. The lighting and/or display device according to claim 1, comprising an ASIC for each individual module.

12. The lighting and/or display device according to claim 1, comprising switches suitable for occupying a semi-open position to fulfil a current regulating/limiting function.

13. The lighting and/or display device according to claim 1, wherein the switches are controlled switches.

14. A method for managing a lighting and/or display device with low-voltage individual lighting components, wherein the lighting and/or display device comprises:
a plurality of individual modules electrically connected together and being able to be arranged in at least one configuration, wherein the at least one configuration includes an arrangement in series,
at least one module among the individual modules comprising a lower terminal and an upper terminal, between which are arranged at least two individual lighting components and a plurality of switches connected together within the module, the switches being able to arrange the two individual lighting components in series or in parallel between the two lower and upper terminals,
at least another module among the individual modules comprising a lower terminal and an upper terminal, between which is arranged at least one individual lighting component, and
wherein each respective module among the at least one module and the at least one other module comprises a respective control circuit for switches of said respective module, each of the control circuits being connected to the device so as to have, at terminals of the control circuit, a low-voltage potential difference corresponding to a potential difference between the lower terminal and the upper terminal of said respective module or a potential difference between a terminal of said respective module and a terminal of a neighbouring module,
the method comprising:
determining a position of the switches of the individual module to arrange two individual lighting components in series or in parallel, and
electrically powering a control circuit for said switches of the individual module from a low-voltage potential difference corresponding to the potential difference between the lower terminal and the upper terminal of said individual module or the potential difference between a terminal of said individual module and a terminal of a neighbouring individual module.

15. The method for managing the lighting and/or display device according to claim 14, comprising:
measuring at least one quantity at the level of a module;
transmitting said measured quantity to at least one control circuit or a computer;
determining the position of a switch of a module or of a subassembly of modules and controlling of the opening or closing of the at least one switch, by taking into account said measured quantity.

16. The method for managing the lighting and/or display device according to claim 15, comprising regulating, by hysteresis, the configuration of the lighting and/or display device.

17. The lighting and/or display device according to claim 1, wherein the light-emitting diodes are selected from the group consisting of LED, OLED, PLED and PHLED.

18. The lighting Lighting and/or display device according to claim 4, wherein the quantity is a current, a light intensity generated, a voltage, or a temperature.

19. The lighting and/or display device according to claim 13, wherein the controlled switches are bipolar transistors or MOS transistors.

20. The method for managing the lighting and/or display device according to claim 15, wherein the quantity is a current, a voltage, a temperature, or a light intensity.

21. The lighting and/or display device according to claim 1, wherein the at least one other module comprises at least another individual lighting component and a plurality of switches, the switches being able to arrange the two individual lighting components in series or in parallel between the two lower and upper terminals.

22. The lighting and/or display device according to claim 3, wherein the at least one other module comprises:
a first branch extending between its lower and upper terminals and comprising, in order, at least one LED and a switch,
a second branch parallel to the first branch between its lower and upper terminals comprising, in order, a switch and at least one LED, and an intermediate branch comprising an intermediate switch and respectively linking intermediate terminals arranged between the at least one LED and the switch of each of the two parallel branches.

23. The lighting and/or display device according to claim 1, wherein for each of the respective modules, the respective control circuit driving the switches within the respective module is powered by the low voltage potential difference between the lower terminal and the upper terminal of the respective module.

24. The lighting and/or display device according to claim 23, wherein the at least one module and the at least one other module are able to be arranged in the at least one configuration by switches between the modules, and wherein the device comprises a control circuit operating the switches between the modules, wherein the control circuit is powered by the low voltage potential difference between terminals of the at least one module and the at least one other module.

* * * * *